United States Patent [19]
Kim

[11] Patent Number: 5,943,207
[45] Date of Patent: Aug. 24, 1999

[54] CIRCUIT BREAKER MOUNTING APPARATUS

[75] Inventor: Ho Soung Kim, Chungcheongbuk-Do, Rep. of Korea

[73] Assignee: LG Industrial Systems, Co., Ltd., Seoul, Rep. of Korea

[21] Appl. No.: 08/879,710

[22] Filed: Jun. 20, 1997

[30] Foreign Application Priority Data

Jun. 22, 1996 [KR] Rep. of Korea ...................... 96-23095

[51] Int. Cl.⁶ ..................................................... H02B 1/04
[52] U.S. Cl. ........................... 361/673; 361/809; 361/825
[58] Field of Search ..................................... 200/293–296; 361/600–601, 631, 634–636, 652–656, 673, 807, 809–810, 825, 829

[56] References Cited

U.S. PATENT DOCUMENTS 3,218,519 11/1965 Casey ....................................... 361/634
3,398,249 8/1968 Dessert ..................................... 361/652

*Primary Examiner*—Gregory Thompson

[57] ABSTRACT

A mountable circuit breaker assembly and a method for mounting a circuit breaker on a base. A body portion of the circuit breaker is provided with rail insertion grooves on opposite sides thereof. The rail insertion grooves receive stepped portions of a corresponding pair of mounting rails mounted on a base. The circuit breaker body is retained relative to the mounting rails by engaging a protruding portion provided on one of the stepped portion of the mounting rails and the rail insertion grooves with a recessed portion provided on the other of the stepped portion of the mounting rails and the rail insertion grooves. The circuit breaker may be mounted onto a base on which the pair of mounting rails is provided by sliding the circuit breaker body between the mounting rails so that the respective stepped portions of the mounting rails are received in the respective rail insertion grooves provided on the circuit breaker body.

27 Claims, 12 Drawing Sheets

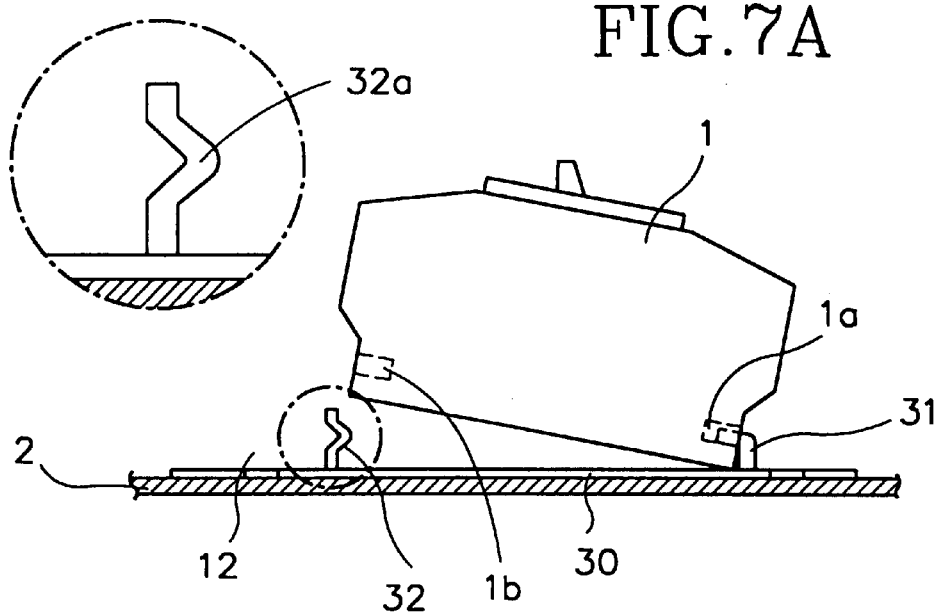
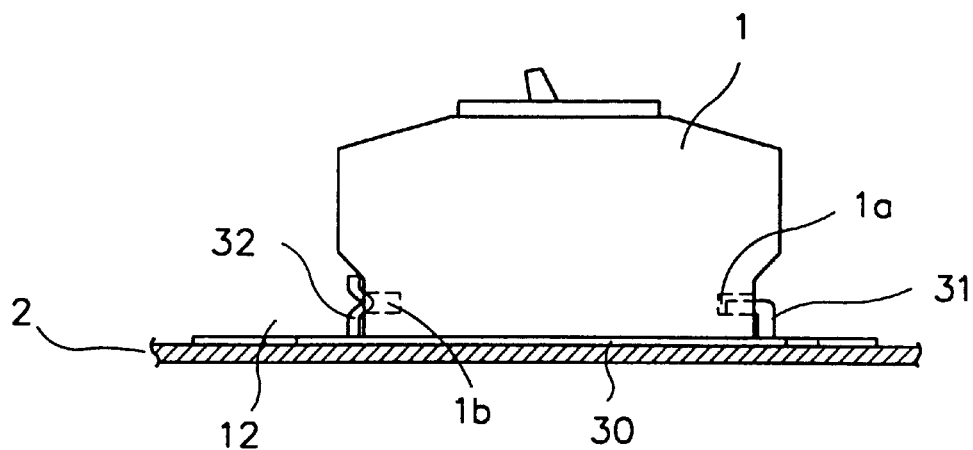

CIRCUIT BREAKER MOUNTING APPARATUS

BACKGROUND OF THE INVENTION

1. Field of the Invention

The present invention relates to a circuit breaker, and more particularly to an improved circuit breaker mounting apparatus capable of easily mounting a circuit breaker thereto without using an extra working tool, for thereby enhancing workability and productivity.

2. Description of the Prior Art

In general, a circuit breaker for switching on or off current flow is provided in an electric power distributing board which may be applicable to a domestic or industrial purpose, and it serves to protect electric appliances especially in a case in which there occurs an overcharge, short-circuit or erroneous current.

With reference to FIGS. 1 and 2A, 2B, a circuit breaker mounting apparatus according to a conventional art is provided with a circuit breaker body 1, a base plate 2 formed on a bottom surface of a power distributing board (not shown) and for supporting the circuit breaker body 1, a pair of holders 3 for connecting and holding the circuit breaker body 1 and the base plate 2 to each other, and a pair of bolts and nuts 4, 5 for fixing the holders 3 to the base plate 2.

In lower side end portions of the circuit breaker body 1 there are respectively formed a source side recess 1a and a load side recess 1b. In a side portion of each of the holders 3 there is formed a slot 3a for receiving the bolt 4 therethrough, and another side portion of each of the holders 3 is upwardly cranked.

The mounting operations of the thusly constituted conventional circuit breaker mounting apparatus will now be described.

First, a pair of engagement holes are marked on and then formed through predetermined portions of the base plate 2. The holders 3 are tentatively fastened by the bolts 4. The circuit breaker body 1 is pushingly adjusted such that each end portion of the holders 3 can be inserted into a corresponding one of the recesses 1a, 1b. The bolts 4 are fastened through the slot 3a to the base plate 2 and the nuts 5 are screwed onto the bolts 5 for thereby completing the operation of mounting the circuit breaker onto the base plate 2.

However, the circuit breaker mounting apparatus according to the conventional art requires one pair of holders, bolts and nuts, for thereby increasing the parts number thereof.

Further, the increased parts number complicates working steps and accordingly deteriorates productivity caused by an extra use of a working tool.

SUMMARY OF THE INVENTION

Therefore, it is an object of the present invention to provide a circuit breaker mounting apparatus capable of easily mounting a circuit breaker thereto without using an extra working tool, for thereby enhancing workability and productivity.

Firstly, to achieve the above-described object, there is provided a circuit breaker mounting apparatus according to the present invention which includes a base plate, a fixing plate engaged to the base plate and including a fixing portion carved and pushed up from a side thereof and a supporting portion carved and pushed up from another side thereof, a fixing holder for being abutted to an upper surface of the supporting portion of the fixing plate, and a circuit breaker body including first and second hooker recesses formed in each of lower side portions thereof, wherein the fixing portion serving as a hook becomes inserted into the first hooker recess and an inner end portion of the fixing holder becomes inserted into the second hooker recess.

Secondly, to achieve the above-described object, there is provided a circuit breaker mounting apparatus according to the present invention which includes a base plate, a fixing plate engaged to the base plate and including a fixing portion carved and pushed up from a side thereof and an elastic support portion carved and pushed up from another side thereof, and a circuit breaker body including first and second hooker recesses formed in each of lower side portions thereof, wherein the fixing portion serving as a hook becomes inserted into the first hooker recess and the elastic support portion elastically becomes inserted into the second hooker recess.

Thirdly, to achieve the above-described object, there is provided a circuit breaker mounting apparatus according to the present invention which includes a base plate, a fixing plate engaged to the base plate and including an elastic support portion carved and pushed up from each side portion thereof, and a circuit breaker body including first and second hooker recesses formed in each of lower side portions thereof, wherein the elastic support portion serving as a hook is elastically inserted into each of the first and second hooker recesses.

Fourthly, to achieve the above-described object, there is provided a circuit breaker mounting apparatus according to the present invention which includes a base plate, a front fixing rail and a rear fixing rail respectively provided lengthywardly on the base plate, and including an inwardly stepped portion having a plurality of bosses formed on a lower surface thereof, wherein the plurality of bosses are spaced from each other for respectively serving to fix a plurality of circuit breakers therealong, and a circuit breaker body including a rail insertion opening formed in each lower side surface thereof, which opening has a fixing recess formed in a lower central surface portion of the rail inserting opening, whereby the fixing boss formed on the lower surface of each of the front and rear fixing rails becomes fixingly clicked into the fixing recess.

Fifthly, to achieve the above-described object, there is provided a circuit breaker mounting apparatus according to the present invention which includes a base plate, a front fixing rail and a rear fixing rail respectively provided lengthywardly on the base plate, and including an inwardly stepped portion having a plurality of ridges widthwisely formed on a lower surface thereof, wherein the plurality of ridges are spaced from each other for respectively serving to fix a plurality of circuit breakers therealong, and a circuit breaker body including a rail insertion opening formed in each lower side surface thereof, which opening has a fixing furrow formed in a lower central surface portion of the rail inserting opening, whereby the fixing ridge formed on the lower surface of each of the front and rear fixing rails becomes fixingly clicked into the fixing recess.

Sixthly, to achieve the above-described object, there is provided a circuit breaker mounting apparatus according to the present invention which includes a base plate, a front fixing rail and a rear fixing rail respectively provided lengthywardly on the base plate, and including an inwardly stepped portion having a plurality of ridges widthwisely formed on a lower surface thereof, wherein the plurality of ridges respectively have an elastic characteristic and are spaced from each other for respectively facilitating the mounting of a plurality of circuit breakers therealong, and a circuit breaker body including a rail insertion opening formed in each lower side surface thereof, which opening has a fixing furrow formed in a lower central surface portion of the rail inserting opening, whereby the fixing ridge formed on the lower surface of each of the front and rear fixing rails becomes elastically clicked into the fixing recess.

BRIEF DESCRIPTION OF THE DRAWINGS

The present invention will become more clearly understood with reference to the detailed description given hereinbelow, and the accompanying drawings only given by way of illustrations only and thus not limited to the present invention, wherein:

FIG. 7A is a schematic side view illustrating a mounting step of the circuit breaker mounting apparatus according to the second embodiment of the present invention;

FIG. 7B is an enlarged view of a portion of the apparatus in FIG. 7A

FIG. 7C is a schematic side view illustrating the mounted circuit breaker mounting apparatus according to the second embodiment of the present invention;

DETAILED DESCRIPTION OF THE INVENTION

With reference to the accompanying drawings, the circuit breaker mounting apparatus according to a first embodiment of the present invention will now be described.

Figure 1:
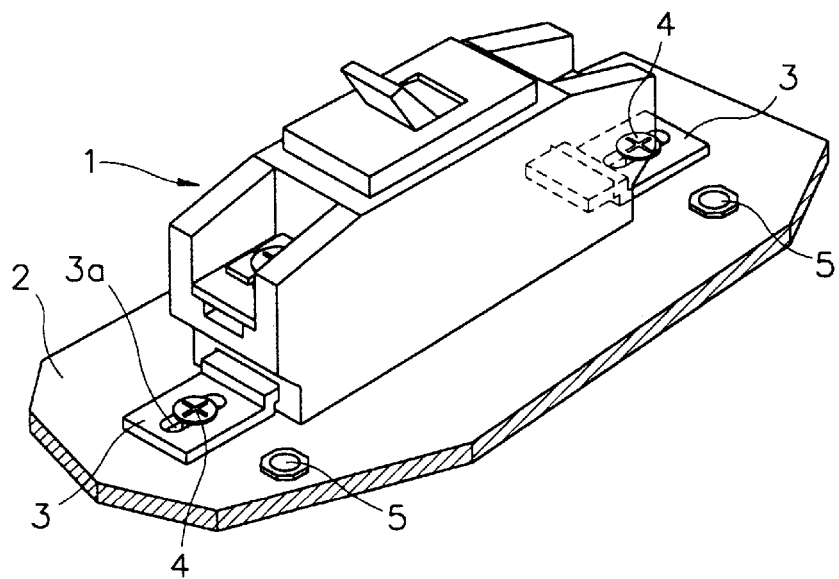
FIG. 1 is a perspective view of a circuit breaker mounted on a base plate according to a conventional art.
Figure 2A:
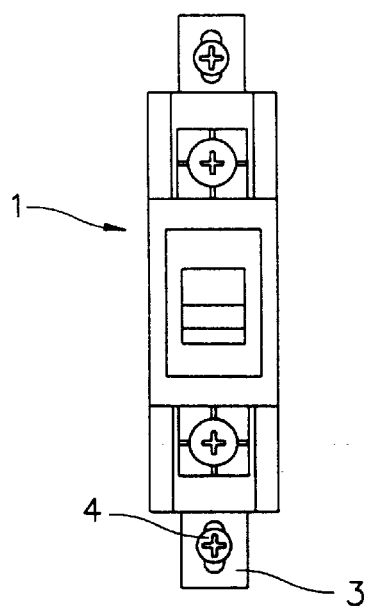
FIG. 2A is a plan view of a circuit breaker mounted on a base plate according to the conventional art.
Figure 2B:
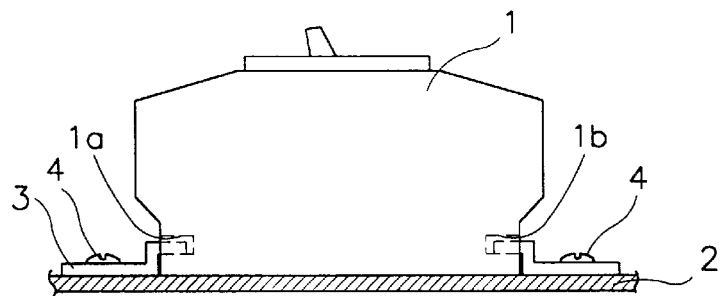
FIG. 2B is a side view of a circuit breaker mounted on a base plate according to the conventional art.
Figure 3:
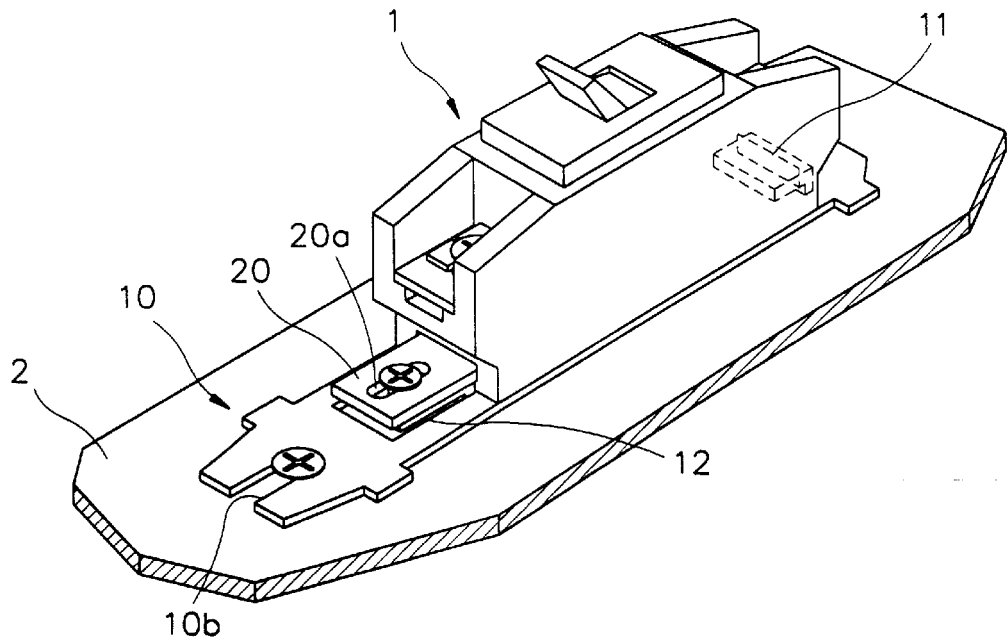
FIG. 3 is a perspective view illustrating a circuit breaker mounting apparatus according to a first embodiment of the present invention.
Figure 4:
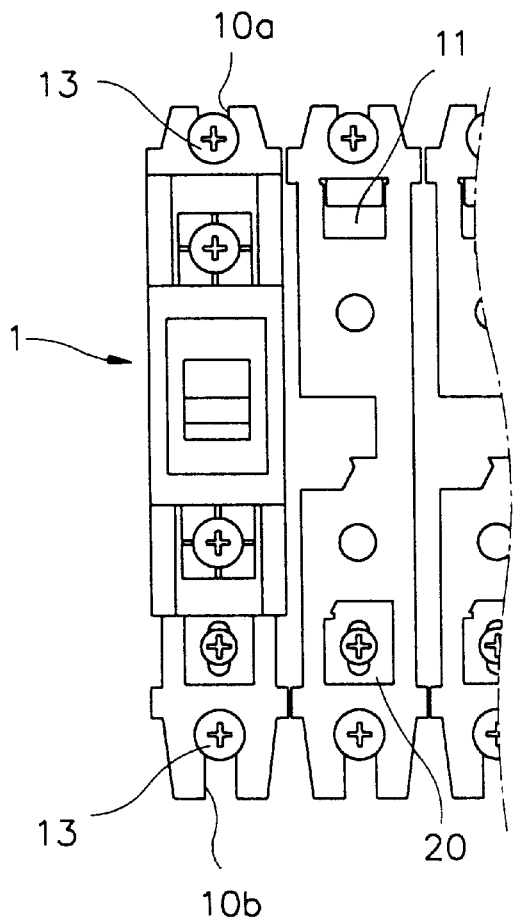
FIG. 4 is a plan view illustrating a circuit breaker mounting apparatus according to the first embodiment of the present invention.
Figure 5A:
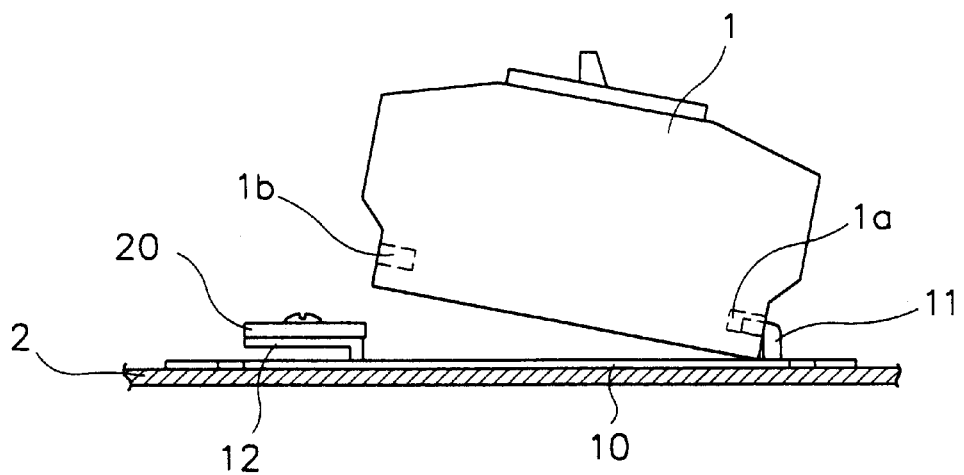
FIG. 5A is a schematic side view illustrating a mounting step of the circuit breaker mounting apparatus according to the first embodiment of the present invention.
Figure 5B:
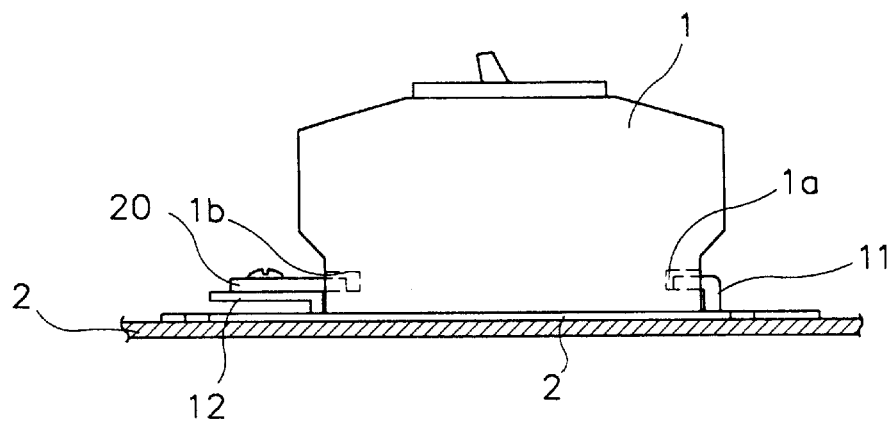
FIG. 5B is a schematic side view illustrating the mounted circuit breaker mounting apparatus according to the first embodiment of the present invention.

FIG. 3 is a perspective view illustrating a circuit breaker mounting apparatus according to a first embodiment of the present invention, FIG. 4 is a plan view illustrating a circuit breaker mounting apparatus according to the first embodiment of the present invention, FIG. 5A is a schematic side view illustrating a mounting step of the circuit breaker mounting apparatus according to the first embodiment of the present invention, and FIG. 5B is a schematic side view illustrating the mounted circuit breaker mounting apparatus according to the first embodiment of the present invention.

As shown therein, the circuit breaker mounting apparatus according to the present invention is provided with: a base plate 2 for mounting a circuit breaker body 1 thereon; a fixing plate 10 fixed to the base plate 2 and including a fixing portion 11 at a side thereof and a supporting portion 12 at another side thereof; a fixing holder 20 for being abutted to the upper surface of the supporting portion 12 of the fixing plate 10; and a circuit breaker body 1 including hooker recesses 1a, 1b formed in each of lower side portions thereof, wherein the fixing portion 11 serving as a hook becomes inserted into the hooker recess 1a and the fixing holder 20 becomes inserted into the hooker recess 1b.

The fixing portion 11 of the fixing plate 10 is upwardly and inwardly bent in a hook type. A female screw is formed through the supporting portion 12 which is upwardly and outwardly bent in a hook type so as to fix the fixing holder 20 therethrough using the bolt 13.

The fixing holder 20 includes a slot 20a formed therein so as to reciprocate rear to front along the upper surface of the supporting portion 12.

A U-type opening 10b is formed at the front of the fixing plate 10 for carrying out a bolt engagement, and an engagement hole 10a is formed in the rear of the fixing plate 10 for a bolt engagement, whereby the fixing plate 10 is fixed to the base plate 2.

The fixing operation of the thusly constituted circuit breaker mounting apparatus will now be described.

The fixing plates 10 corresponding to the number of circuit breakers required are respectively fixed to the corresponding base plate 2. At this time, the opening 10b and the engagement hole 10a formed in side end portions of the fixing plate 10 are fixed to the base plate 2 using respectively the bolt 13.

As shown in FIG. 5A, in order to mount the circuit breaker body 1 on the fixing plate 10, a bottom edge portion of the circuit breaker body 1 is initially placed on the plate 10 so that the hooker recess 1a can receive the fixing portion 11, and then the circuit breaker body 1 is safely positioned on the upper surface of the fixing plate 10 as shown in FIG. 5B. An inner edge portion of the fixing holder 20 engaged to the supporting portion 12 is pushed into the hooker recess 1b in the circuit breaker 1, and the bolt 13 is screwed through the slot 20d into the female screw formed in the supporting portion 12 for thereby completing the mounting of the circuit breaker body 1 on the fixing plate 10.

With such applications, a desired number of circuit breakers can be easily mounted on a plurality of fixing plates.

As described above, in the circuit breaker mounting apparatus according to the first embodiment of the present invention, an extra fixing plate is fixed to a base plate portion on which the circuit breaker is to be mounted. A side edge portion of the circuit breaker is positioned on the fixing plate so as to fix the circuit breaker to the fixing plate by using the fixing holder which is movably provided on the upper surface of the supporting portion, for thereby facilitating the mounting operation of a circuit breaker on the fixing plate.

Figure 6:
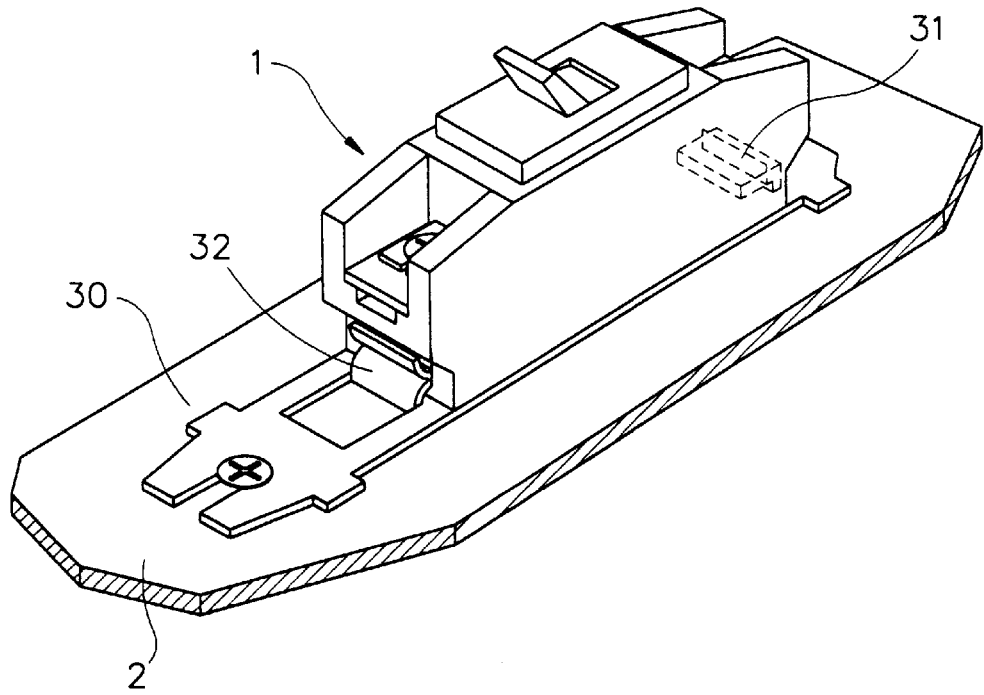
FIG. 6 is a perspective view illustrating a circuit breaker mounting apparatus according to a second embodiment of the present invention.
Figure 8A:
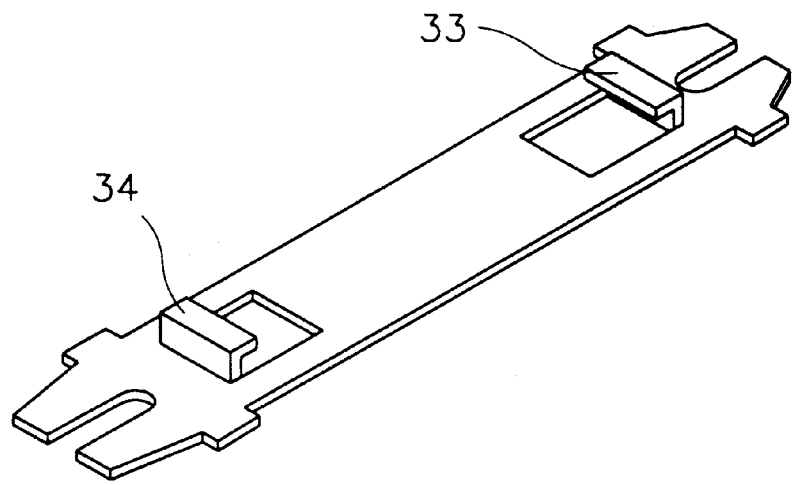
FIG. 8A is a perspective view illustrating a pair of modified mounting holders of the circuit breaker mounting apparatus in FIG. 6.
Figure 8B:
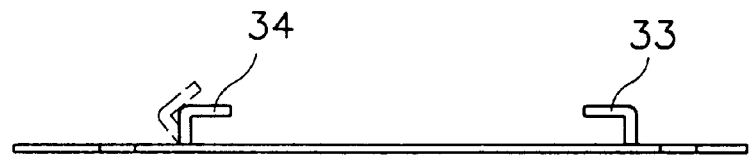
FIG. 8B is a side view illustrating the pair of modified mounting holders of the circuit breaker mounting apparatus in FIG. 6.
Figure 9A:
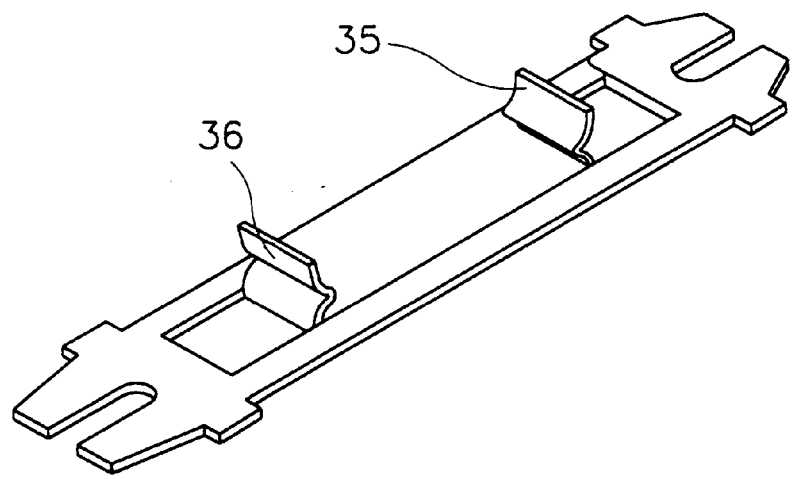
FIG. 9A is a perspective view illustrating a pair of further modified mounting holders of the circuit breaker mounting apparatus in FIG. 6.
Figure 9B:
FIG. 9B is a side view illustrating the pair of further modified mounting holders of the circuit breaker mounting apparatus in FIG. 6.

FIG. 6 is a perspective view illustrating a circuit breaker mounting apparatus according to a second embodiment of the present invention, FIG. 7A is a schematic side view illustrating a mounting step of the circuit breaker mounting apparatus according to the second embodiment of the present invention, FIG. 7C is a schematic side view illustrating the mounted circuit breaker mounting apparatus according to the second embodiment of the present invention, FIG. 8A is a perspective view illustrating a pair of modified mounting holders of the circuit breaker mounting apparatus in FIG. 6, FIG. 8B is a side view illustrating the pair of modified mounting holders of the circuit breaker mounting apparatus in FIG. 6, FIG. 9A is a perspective view illustrating a pair of further modified mounting holders of the circuit breaker mounting apparatus in FIG. 6, and FIG. 9B is a side view illustrating the pair of further modified mounting holders of the circuit breaker mounting apparatus in FIG. 6.

As shown therein, the circuit breaker mounting apparatus according to the second embodiment of the present invention is provided with: a base plate 2 for mounting a circuit breaker body 1 thereabove; a fixing plate 30 fixed to the base plate 2 and including a fixing portion 31 at a side thereof and an elastic support portion 32 formed at another side thereof; and a circuit breaker body 1 including hooker recesses 1a, 1b sequentially formed in each of lower side portions thereof, wherein the fixing portion 31 serving as a hook becomes inserted into the hooker recess 1a and the elastic support portion 32 becomes partially inserted into the hooker recess 1b and elastically supports the circuit breaker body 1.

The fixing portion 31 is cuttingly pushed up from a side portion of the fixing plate 30 and inwardly bent in a hook type.

Also, the elastic support portion 32 is cuttingly pushed up from another side portion of the fixing plate 30 and a middle portion of the elastic support portion is inwardly crooked so as to form a fixing node 32a.

As a modified example of the second embodiment of the present invention, fixing portions 33, 34 may be formed in each side of the fixing plate 30 as shown in FIGS. 8A and 8B, or elastic fixing portions 35, 36 may be formed in each side of the fixing plate 30 as shown in FIGS. 9A and 9B. At this time, when there are provided the fixing portions 33, 34, the fixing portion 34 may be elastically formed so as to facilitate the fixture of the circuit breaker body 1 to the fixing plate 30.

The assembly steps of the thusly composed circuit breaker mounting apparatus according to the second embodiment of the present invention will now be described.

First, the fixing plate 30 is fixed to the base plate 2, and as shown in FIG. 7A while the bottom of the circuit breaker body 1 is tipped on the fixing plate 30, the fixing portion 31 is inserted into the hooker recess 1a. The other hooker recess 1b is inserted thereinto by the fixing ridge 32a of the elastic support portion 32. At this time, the elastic fixing portion 32 serves to be outwardly pushed when a lower end portion of the circuit breaker body 1 becomes contacted to the elastic fixing portion 32 due to the elastic characteristic of the elastic support portion 32, whereby the fixing node 32a becomes easily inserted into the fixing recess 1b of the circuit breaker body 1. The same effects are obtained by modifying the fixing plate 30 as in FIGS. 8A and 9A.

As described above, the circuit breaker mounting apparatus according to the second embodiment of the present invention is provided with a base plate 2 for mounting a circuit breaker body 1 thereabove, a fixing plate 30 fixed to the base plate 2 and including a fixing portion 31 at a side thereof and an elastic support portion 32 formed at another side thereof, and a circuit breaker body 1 including hooker recesses 1a, 1b sequentially formed in each of lower side portions thereof, so that the fixing portion 31 serving as a hook becomes inserted into the hooker recess 1a and the elastic support portion 32 becomes partially inserted into the hooker recess 1b and elastically supports the circuit breaker body 1, wherein a front side of the circuit breaker body 1 is pushed for being mounted on the fixing plate after an insertion of the fixing portion into the circuit breaker body, whereby the circuit breaker becomes easily mounted onto the fixing plate without using an extra working tool. Here, the same effects can be obtained even though the fixing plate is modified as in FIGS. 8A and 9A.

Figure 10:
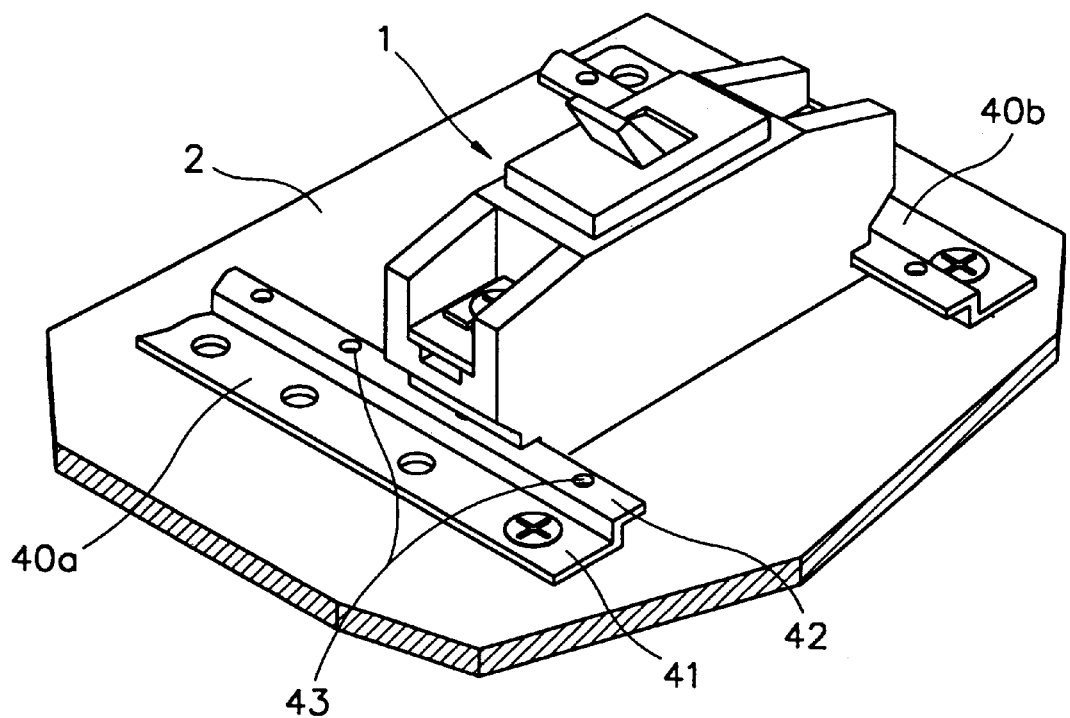
FIG. 10 is a perspective view illustrating a circuit breaker mounting apparatus according to a third embodiment of the present invention.
Figure 11A:
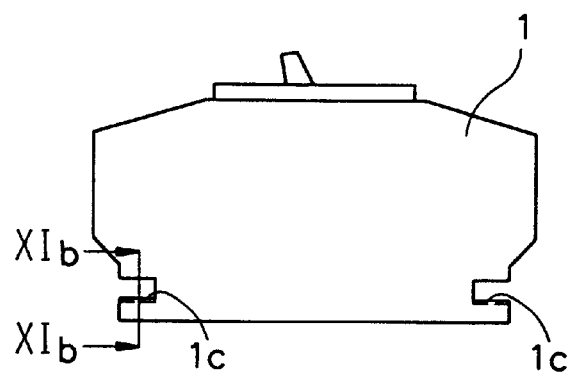
FIG. 11A is a side view illustrating the circuit breaker mounting apparatus in FIG. 10.
Figure 11B:
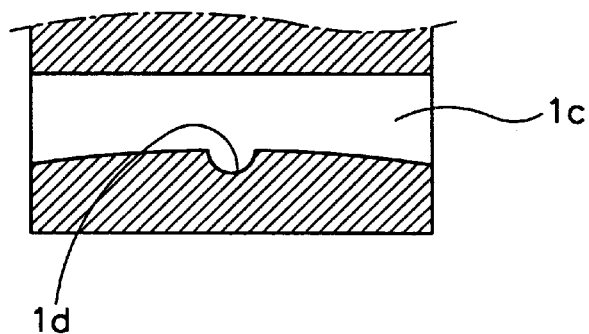
FIG. 11B is a cross-sectional view taken along line XIb—XIb in FIG. 11A.
Figure 12A:
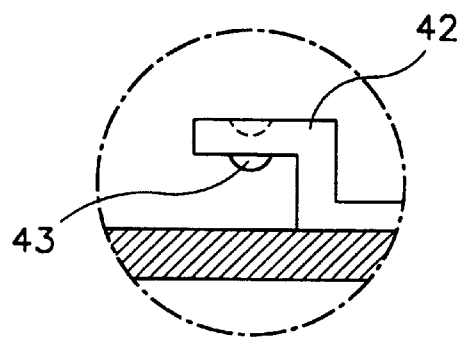
FIGS. 12A and 12B, hereinafter referred to as FIG. 12, are views of the circuit breaker mounting apparatus in FIG. 10.
Figure 12B:
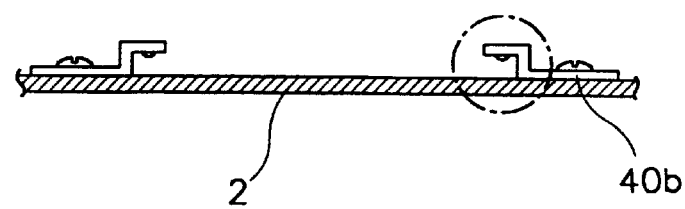
Figure 13:
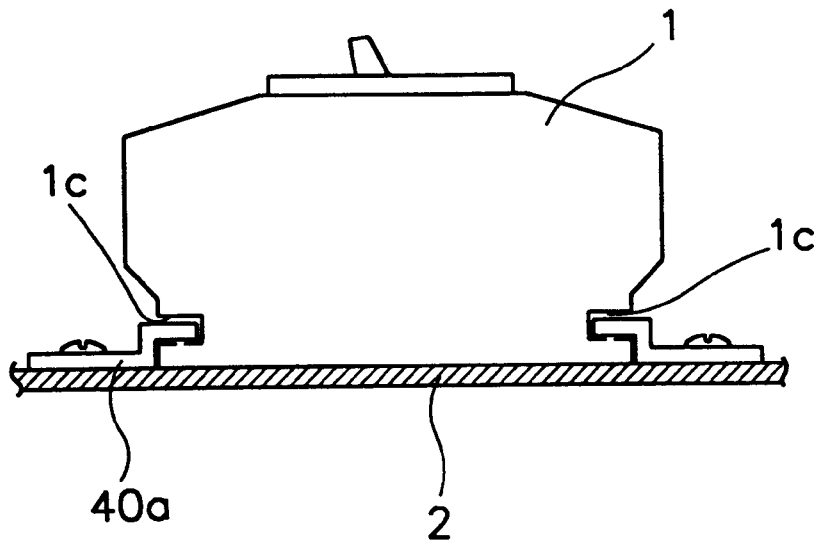
FIG. 13 is a side view illustrating the circuit breaker mounting apparatus in FIG. 10.

FIG. 10 is a perspective view illustrating a circuit breaker mounting apparatus according to a third embodiment of the present invention, FIG. 11A is a side view illustrating the circuit breaker mounting apparatus in FIG. 10, FIG. 11B is a cross-sectional view taken along line XIb—XIb in FIG. 11A, FIG. 12 is a side view of the circuit breaker mounting apparatus in FIG. 10, and FIG. 13 is a side view illustrating the circuit breaker mounting apparatus in FIG. 10;

As further shown therein, the circuit breaker mounting apparatus according to the third embodiment of the present invention is provided with: a base plate 2 for mounting a circuit breaker body 1 thereon; a fixing plate 30 fixed to the base plate 2 and including a fixing portion 31 at a side thereof and an elastic support portion 32 formed at another side thereof, and a circuit breaker body 1 including hooker recesses 1a, 1b formed in each of lower side portions thereof, so that the fixing portion 31 serving as a hook becomes inserted into the hooker recess 1a and the elastic support portion 32 becomes partially inserted into the hooker recess 1b and elastically supports the circuit breaker body 1, wherein a front side of the circuit breaker body 1 is pushed for being mounted on the fixing plate after an insertion of the fixing portion into the circuit breaker body, whereby the circuit breaker becomes easily mounted onto the fixing plate without using an extra working tool.

Here, the same effects can be obtained even though the fixing plate is modified as in FIGS. 8A and 9A.

FIG. 10 is a perspective view illustrating a circuit breaker mounting apparatus according to a third embodiment of the present invention, FIG. 11A is a side view illustrating the circuit breaker mounting apparatus in FIG. 10, FIG. 11B is a cross-sectional view taken along line XIb—XIb in FIG. 11A, FIG. 12 is a side view of the circuit breaker mounting apparatus in FIG. 10, and FIG. 13 is a side view illustrating the circuit breaker mounting apparatus in FIG. 10.

The circuit breaker mounting apparatus according to the third embodiment of the present invention is provided with: a base plate 2 for mounting a circuit breaker body 1 thereon; a front fixing rail 40a and a rear fixing rail 40b provided lengthywardly on the base plate 2 and including an inwardly stepped portion and a plurality of bosses 43 formed on the lower surface of the stepped portion 42 of the front fixing rail 40a wherein the plurality of bosses are spaced from each so as to respectively serve to fix a plurality of circuit breakers thereon; a circuit breaker body 1 including rail insertion furrow 1c formed in each lower side surface thereof, a fixing recess 1d in the lower central surface portion of the rail inserting furrow 1c, whereby the fixing boss 43 formed on the lower surface of each of the front and rear fixing rails 40a, 40b becomes clicked into the fixing recess 1d.

The assembly steps of the thusly composed circuit breaker fixing apparatus will now be described.

The front fixing rail 40a and the rear fixing rail 40b are respectively fixed to the base plate 2 using bolts. The rail insertion groove 1c formed in each lower side surface portion of the circuit breaker is aligned with the stepped portions 42 of the front and rear fixing rails 40a, 40b and then the circuit breaker body 1 is slidably pushed from a side thereof. Here, when the circuit breaker body 1 is pushed along the stepped portions 42, the fixing boss 43 becomes clicked into the fixing recess 1d, for thereby completing the assembly of the circuit breaker and the circuit breaker mounting apparatus according to the third embodiment of the present invention.

Also, there are provided a plurality of fixing bosses 43 respectively with a predetermined distance spaced from each other and formed on the lower surface of the stepped portion 42 of the front and rear fixing rails 40a, 40b, so that a desired number of circuit breakers may be fixed between the front and rear fixing rails 40a, 40b.

Figure 14A:
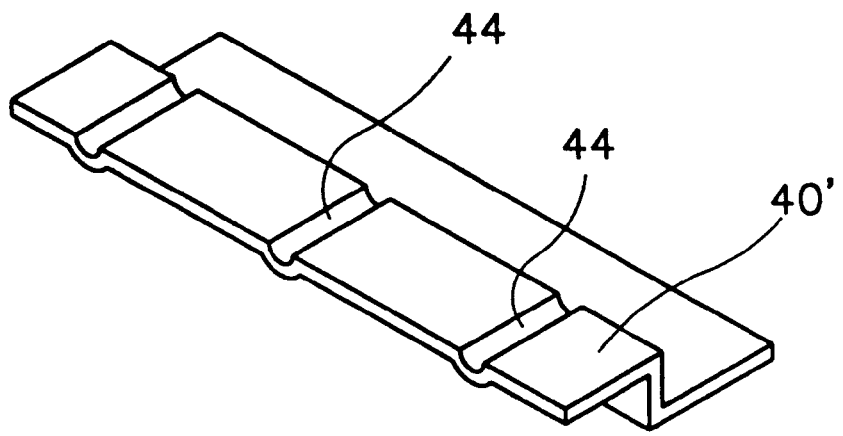
FIG. 14A is a perspective view of a modified mounting rail employed in the circuit breaker mounting apparatus in FIG. 10.
Figure 14B:
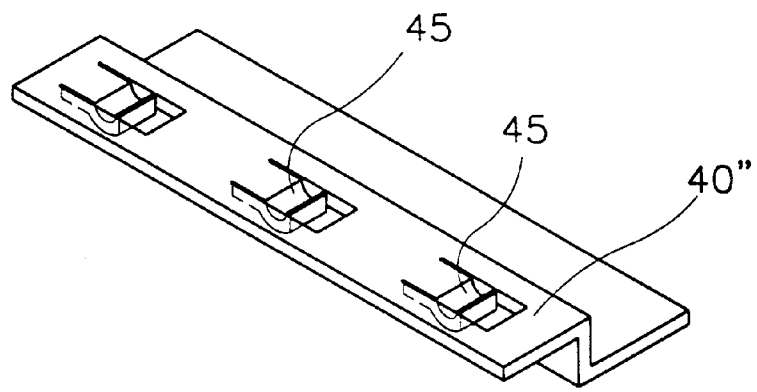
FIG. 14B is a perspective view of a further modified mounting rail employed in the circuit breaker mounting apparatus in FIG. 10.
Figure 14C:
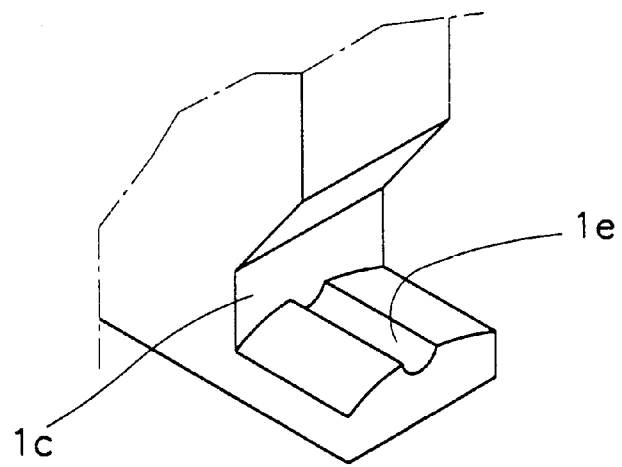
FIG. 14C is a partial perspective view of the circuit breaker mounting apparatus applicable to the modifier mounting rails in FIGS. 14A and 14B.

FIG. 14A is a perspective view of a modified mounting rail employed in the circuit breaker mounting apparatus in FIG. 10, FIG. 14B is a perspective view of a further modified mounting rail employed in the circuit breaker mounting apparatus in FIG. 10, and FIG. 14C is a partial perspective view of the circuit breaker mounting apparatus applicable to the modifier mounting rails in FIGS. 14A and 14B. As shown therein, the modified mounting rail as shown in FIG. 14A Referring to a modified fixing rail 40' as shown therein, a plurality of ridges 44 are widthwisely formed on the lower surface of a stepped portion of the fixing rail 40' with a predetermined distance spaced from each other, and in the meantime, a plurality of furrows 1e for correspondingly receiving the ridges 44 therein are in a lower surface of the opening 1c which is formed in each lower side portion of the circuit breaker body 1.

With reference to a further modified fixing rail 40" as shown in FIG. 14B, a plurality of ridges 45 formed similar to the ridges 44 are cut along three sides therearound in order for each of the cut portions of the ridges 45 to become elastic, whereby the circuit breaker body 1 is tightly and elastically assembled to the fixing rail 40". Here, the furrows 1e corresponding to the ridges 45 are formed in the lower surface of the opening 1c which is formed in each lower side portion of the circuit breaker body 1, as shown in FIG. 14C.

Figure 15A:
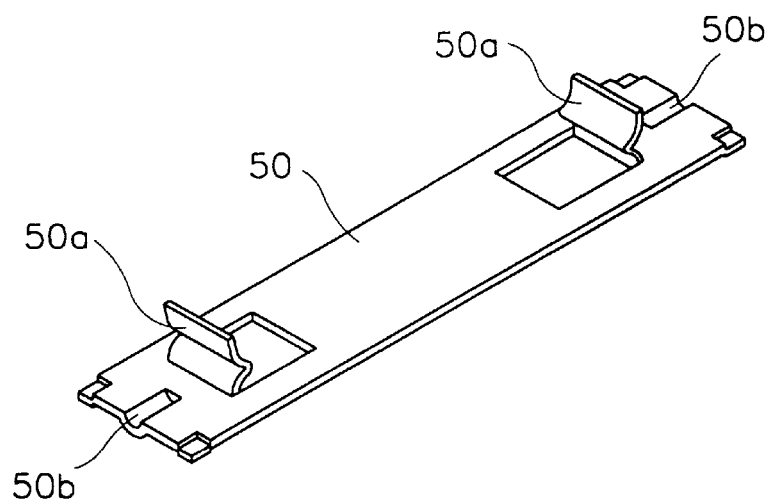
FIG. 15A is a perspective view of a rail fixing plate applicable to the circuit breaker mounting apparatus in FIG. 10.
Figure 15B:
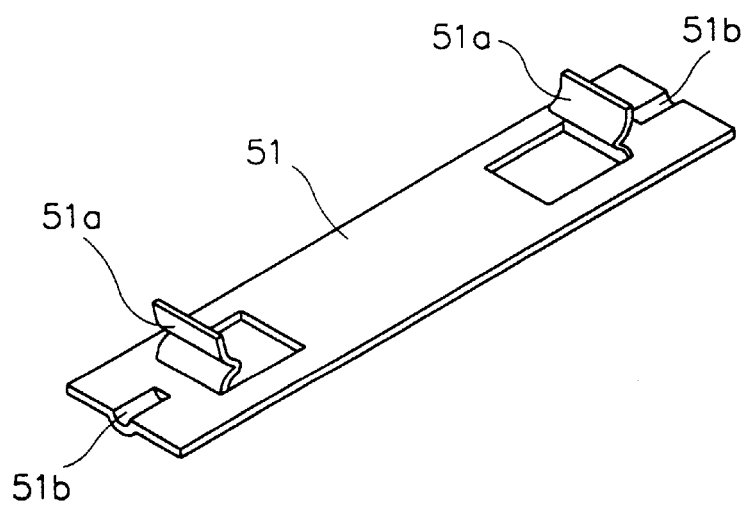
FIG. 15B is a perspective view of a modified rail fixing plate applicable to the circuit breaker mounting apparatus in FIG. 10.

As further shown in FIGS. 15A and 15B, when it is not appropriate to directly insert the circuit breaker body 1 along any of the fixing rails 40', 40", or when different kinds of circuit breakers are required for alignment, the circuit breaker body 1 is fixed to either of extra rail fixing plates 50, 51, so that elastic fixing portions 50a, 51a carved and pushed upwardly from the plates 50, 51 are respectively adjusted to elastically receive the circuit breaker body 1. Also, fixing furrows 50b, 51b respectively become received by a corresponding one of the fixing bosses 43 in FIG. 10.

As described above, the circuit breaker mounting apparatus according to the present invention enables a circuit breaker to be easily mounted thereon without using an extra working tool, for thereby enhancing workability and productivity.

What is claimed is:

1. A mountable circuit breaker assembly comprising:
   a pair of mounting rails each having a first portion at which the rail is fixed to a base and a second raised step portion, said second raised step portion having a surface having a protruding portion; and
   a circuit breaker including a body portion, the body portion including a pair of rail insertion grooves formed on opposing sides thereof sized to receive respective said second raised step portions of said pair of mounting rails therein, wherein each said rail insertion groove includes a recessed portion on a surface thereof arranged to as to cooperatively engage with said protruding portion provided on said second raised step portions of said pair of mounting rails.

2. The assembly according to claim 1, wherein said pair of mounting rails each includes an opening formed through respective said first portions thereof to receive a fastener member therethrough.

3. The assembly according to claim 1, wherein said protruding portion is a boss.

4. The assembly according to claim 1, wherein said protruding portion is an elongate ridge.

5. The assembly according to claim 1, wherein said protruding portion is a resiliently flexible tab formed in said second raised step portion.

6. The assembly according to claim 1, wherein said recessed portion is groove.

7. The assembly according to claim 3, wherein said recessed portion is a pit.

8. The assembly according to claim 1, wherein said recessed portion is a pit.

9. A method for mounting a circuit breaker on a base, comprising the steps of:
   providing a pair of mounting rails fixed to a base substantially in parallel, each mounting rail including a first portion at which the mounting rail is fixed to the based and a second stepped portion, the second stepped portions of the pair of mounting rails facing each other relatively, each second stepped portion including a protruding portion on a surface thereof;
   providing a circuit breaker including a body portion having a pair of rail insertion grooves formed therein on opposite sides thereof, each rail insertion groove having a recessed portion on a surface thereof;
   slidingly engaging the respective second stepped portions in the respective grooves in the body portion; and positionally fixing the circuit breaker relative to the pair of mounting rails by engaging the protruding portion of each second stepped portion with the recessed portion of each rail insertion groove.

10. The method according to claim 9, wherein the protruding portion is a resiliently flexible tab formed in the second stepped portion.

11. The method according to claim 9, wherein the recessed portion is a groove.

12. The method according to claim 9, wherein the protruding portion is a boss.

13. The method according to claim 12, wherein the recessed portion is a pit.

14. The method according to claim 9, wherein the recessed portion is a pit.

15. A mountable circuit breaker assembly comprising:
   a pair of mounting rails each having a first portion at which the rail is fixed to a base and a second raised step portion, said second raised step portion having a surface having a recessed portion; and
   a circuit breaker including a body portion, the body portion including a pair of rail insertion grooves formed on opposing sides thereof sized to receive respective said second raised step portions of said pair of mounting rails therein, wherein each said rail insertion groove includes a protruding portion on a surface thereof arranged to as to cooperatively engage with said recessed portion provided on said second raised step portions of said pair of mounting rails.

16. The assembly according to claim 15, wherein said pair of mounting rails each includes an opening formed through respective said first portions thereof to receive a fastener member therethrough.

17. The assembly according to claim 15, wherein said protruding portion is a boss.

18. The assembly according to claim 15, wherein said protruding portion is an elongate ridge.

19. The assembly according to claim 15, wherein said recessed portion is groove.

20. The assembly according to claim 17, wherein said recessed portion is a pit.

21. The assembly according to claim 15, wherein said recessed portion is a pit.

22. A method for mounting a circuit breaker on a base, comprising the steps of:
   providing a pair of mounting rails fixed to a base substantially in parallel, each mounting rail including a first portion at which the mounting rail is fixed to the based and a second stepped portion, the second stepped portions of the pair of mounting rails facing each other relatively, each second stepped portion including a recessed portion on a surface thereof;
   providing a circuit breaker including a body portion having a pair of rail insertion grooves formed therein on opposite sides thereof, each rail insertion groove having a protruding portion on a surface thereof;
   slidingly engaging the respective second stepped portions in the respective grooves in the body portion; and
   positionally fixing the circuit breaker relative to the pair of mounting rails by engaging the recessed portion of each second stepped portion with the protruding portion of each rail insertion groove.

23. The method according to claim 22, wherein the protruding portion is an elongate ridge.

24. The method according to claim 22, wherein the recessed portion is a groove.

25. The method according to claim 22, wherein the protruding portion is a boss.

26. The method according to claim 25, wherein the recessed portion is a pit.

27. The method according to claim 22, wherein the recessed portion is a pit.

* * * * *